('12) United States Patent
Goodrum et al.

(10) Patent No.: US 10,498,619 B2
(45) Date of Patent: Dec. 3, 2019

(54) DISCOVERING CONNECTION OF PASSIVE CABLES

(71) Applicant: HEWLETT PACKARD ENTERPRISE DEVELOPMENT LP, Houston, TX (US)

(72) Inventors: Alan L. Goodrum, Tomball, TX (US); Kuang-Yi Wu, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 127 days.

(21) Appl. No.: 15/314,889

(22) PCT Filed: Jul. 8, 2014

(86) PCT No.: PCT/US2014/045670
§ 371 (c)(1),
(2) Date: Nov. 29, 2016

(87) PCT Pub. No.: WO2016/007132
PCT Pub. Date: Jan. 14, 2016

(65) Prior Publication Data
US 2017/0195200 A1 Jul. 6, 2017

(51) Int. Cl.
*H04J 3/06* (2006.01)
*H04L 12/26* (2006.01)
(52) U.S. Cl.
CPC .......... *H04L 43/0811* (2013.01); *H04L 43/50* (2013.01)
(58) Field of Classification Search
CPC ..... H04L 43/0811; H04L 43/10; H04L 43/50; H04L 43/0823; H04L 43/08;
(Continued)

(56) References Cited

U.S. PATENT DOCUMENTS 6,154,447 A 11/2000 Vedder
6,353,614 B1 3/2002 Borella et al.
(Continued)

FOREIGN PATENT DOCUMENTS

JP 09-026896 A 1/1997
WO WO-2007059392 5/2007

OTHER PUBLICATIONS

Pachnicke, S., Fiber-Optic Transmission Netwrks, Signals and Communication Technology, 2012, Springer-Verlag Berlin Heidelberg, pp. 11-29.
(Continued)

*Primary Examiner* — Hoang-Chuong Q Vu
(74) *Attorney, Agent, or Firm* — Hewlett Packard Enterprise Patent Department

(57) ABSTRACT

In one example in accordance with the present disclosure, a subsystem is provided. The subsystem includes a signal driver/receiver capable of sending and receiving data and signals over a passive cable. The subsystem includes a connection discovery engine to access a low-level enable or disable control of the signal driver/receiver and a low-level loss-of-signal (LOS) control of the signal driver/receiver. The connection discovery engine modulates the enable or disable control to send a local unique ID of the signal driver/receiver over the passive cable. The connection discovery engine monitors timings of transitions on the LOS control to receive, over the passive cable, a remote unique ID of a signal driver/receiver in a second subsystem connected by the passive cable.

15 Claims, 6 Drawing Sheets

(58) Field of Classification Search
CPC . H04L 43/0882; H04L 43/0888; H04L 43/12; H04L 43/14; H04L 43/18

See application file for complete search history.

(56) References Cited

U.S. PATENT DOCUMENTS

| | | | |
|---|---|---|---|
| 7,359,634 B1 | 4/2008 | Meli | |
| 7,583,902 B2 | 9/2009 | Draper et al. | |
| 7,957,296 B2 | 6/2011 | Ben-Hamo | |
| 8,115,631 B2 | 2/2012 | Lange et al. | |
| 8,509,621 B2 | 8/2013 | Boertjes et al. | |
| 9,608,733 B2 | 3/2017 | Pavlas et al. | |
| 2002/0041337 A1 | 4/2002 | Candelore | |
| 2002/0171889 A1 | 11/2002 | Takeuchi et al. | |
| 2003/0059158 A1 | 3/2003 | Lacey | |
| 2003/0113118 A1 | 6/2003 | Bartur | |
| 2004/0208641 A1* | 10/2004 | Smeulders | H04B 10/0799 398/186 |
| 2006/0013149 A1 | 1/2006 | Jahn et al. | |
| 2006/0106952 A1 | 5/2006 | Bomhoff et al. | |
| 2006/0148279 A1 | 7/2006 | German et al. | |
| 2007/0094410 A1* | 4/2007 | Voigt | H04L 41/08 709/237 |
| 2008/0159738 A1 | 7/2008 | Lavranchuk | |
| 2008/0181235 A1 | 7/2008 | Cagno et al. | |
| 2008/0267620 A1 | 10/2008 | Cole et al. | |
| 2009/0063662 A1 | 3/2009 | Baker et al. | |
| 2010/0092170 A1* | 4/2010 | Deas | H04L 12/2801 398/45 |
| 2010/0215359 A1 | 8/2010 | Li et al. | |
| 2011/0043333 A1* | 2/2011 | German | H04Q 1/136 340/10.1 |
| 2011/0085620 A1* | 4/2011 | Measson | H04L 1/0075 375/299 |
| 2011/0141943 A1 | 6/2011 | Shifris et al. | |
| 2011/0239014 A1 | 9/2011 | Karnowski | |
| 2012/0020675 A1* | 1/2012 | Chuang | H04B 10/40 398/193 |
| 2012/0155867 A1* | 6/2012 | Giessler | H04B 10/40 398/45 |
| 2013/0137291 A1 | 5/2013 | Abuelsaad et al. | |
| 2013/0138839 A1 | 5/2013 | Abuelsaad et al. | |
| 2013/0148976 A1* | 6/2013 | Patel | H04B 10/25 398/116 |
| 2013/0198346 A1 | 8/2013 | Jubran et al. | |
| 2013/0339552 A1 | 12/2013 | Wang | |
| 2014/0029934 A1 | 1/2014 | Xia et al. | |
| 2014/0133846 A1 | 5/2014 | Gao et al. | |
| 2015/0085994 A1* | 3/2015 | Koyabe | H04M 3/08 379/1.03 |
| 2015/0208146 A1 | 7/2015 | Younce et al. | |
| 2016/0021597 A1* | 1/2016 | Hart | H04W 40/06 370/329 |
| 2016/0191188 A1 | 6/2016 | Butler | |
| 2016/0198455 A1* | 7/2016 | Caretti | H04B 17/318 370/329 |

OTHER PUBLICATIONS

Medhi, Von Neumann Architecture, 2012.

International Search Report and Written Opinion received for PCT Patent Application No. PCT/US2014/045679, dated Mar. 27, 2015, 10 pages.

International Preliminary Report on Patentability received for PCT Patent Application No. PCT/US2014/045679, dated Jan. 19, 2017, 9 pages.

International Preliminary Report on Patentability received for PCT Patent Application No. PCT/US2014/045670, dated Jan. 19, 2017, 8 pages.

Fiber Optic Cable and Accessories, (Research Paper), Aug. 3, 2009, 11 Pages.

Bhattacharya, S. K., Basic Electrical and Electronics Engineering, 2012, Pearson, p. 644.

Agnew, Grace, Digital Rights Management, 2008, Elsevier, p. 130.

International Searching Authority, The International Search Report and the Written Opinion, dated Mar. 19, 2015, 11 Pages.

Wagner, R.E. et al., Automatic Discovery of Fiber Optic Structured Cabling Component Locations and Connectivity, (Research Paper), Oct. 5, 2011, 4 Pages.

* cited by examiner

DISCOVERING CONNECTION OF PASSIVE CABLES

BACKGROUND

Data centers are becoming more and more complex. For example, an increased number of components (e.g., computing devices, servers, enclosures, racks and the like) in data centers must be interconnected. These interconnections may be managed by data center operators, and this task may be very difficult in complex data centers. In some situations, these interconnects may be manually cabled, and manual cabling is prone to human errors.

BRIEF DESCRIPTION OF THE DRAWINGS

The following detailed description references the drawings, wherein.

DETAILED DESCRIPTION

Figure 1:
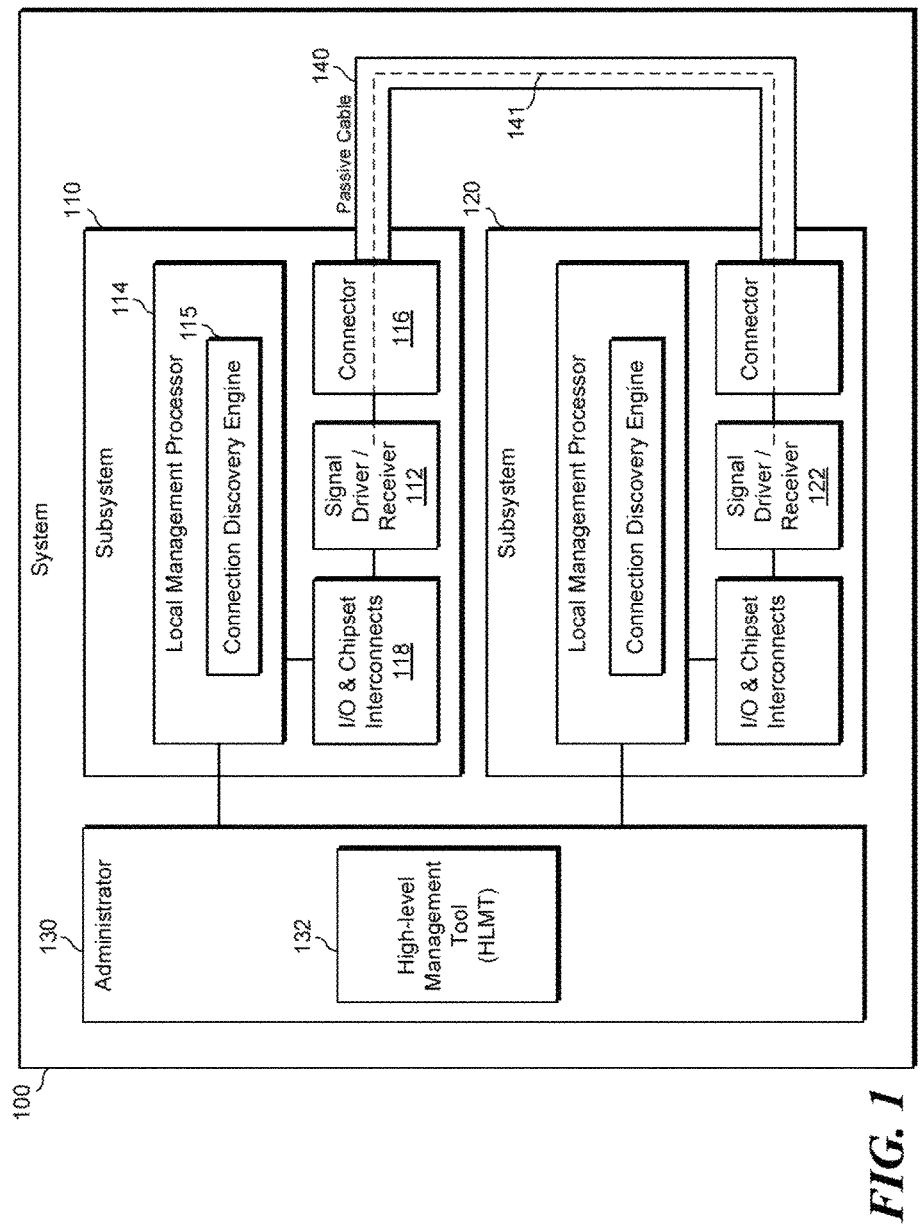
FIG. 1 is a block diagram of an example system for discovering connection of passive cables.

Managing interconnections in complex data centers may be made easier (e.g., for data center operators) if there is a way to provide assistance in reporting which components (e.g., computing devices, servers, enclosures, racks and the like) are connected. One solution to allow for such reporting assistance is to use "smart cables," for example, industry-standard CXP active optical cables. Each end of such a smart cable includes a microcontroller (the "smarts") that stores a unique ID of the cable and is capable of transmitting this unique ID to identify the cable to other data center components, for example, a high-level management tool capable of discovering that various components of a data center are connected to each other. However, in these solutions, for the high-level management tool to discover that two components are connected, it is critical that the cable connecting the two components be a smart cable. Such a solution does not work for passive or "dumb" cables. Smart cables are significantly more costly than passive cables, and they require larger connectors to include the "smarts." Additionally, smart cables consume power at the connector. In some server implementations (e.g., blade enclosures), these smart cables often must be plugged into the back of switch modules, which may be the hottest area of the enclosure. Thus, additional power consumption and heat output in this area is undesirable.

Another solution to help data center operators determine which components are connected is to use a mass-termination system. A mass-termination system is essentially a midplane (or like interconnect fabric) that has a finite number of hardwired interconnect paths between a number of endpoints. Then, a field programmable unit (e.g., an EEPROM) is programmed to indicate which endpoints should be connected via the interconnect paths. Such mass-terminations systems force the connections between the data center components to fit into a limited number of configurations. However, for increasingly complex data centers, the number of possible connection configurations for various components is so large that in many situations, it is not possible to develop a mass-termination implementation that satisfies enough configurations to be practical.

In different contexts, for example, power connectivity (e.g., discovering which server is plugged into which power circuit), some solutions may provide a way for one end of a cable to communicate an identifier to the other end of the cable. However, many of these solutions require a "side-band" communication link (e.g., a serial link) solely for the purpose of connection discovery. Side-band means, in short, that an additional link is required beyond the main link use for the primary purpose of the connection (e.g., power, data communication, etc.). Often these solutions require additional safeguards to ensure that the side-band link does not interfere with the main link, which adds cost, among other drawbacks.

Some example circuits are capable of communicating "extra" information over a cable, during normal data communication by altering the amplitude of a logic '1'.

The present disclosure describes discovering connection of passive cables, for example, a passive cable that connects a first subsystem and a second subsystem. Each subsystem may include a signal driver/receiver (e.g., an "off the shelf" signal driver/receiver) that has various low-level power up/down controls (e.g., an enable/disable input, a loss-of-signal output, etc.). The present disclosure describes accessing these low-level power up/down controls to perform physical layer communication over the passive cable, for example, over the same lines of the cable that are used for normal data communication (i.e., in-band). Such physical layer communication may be performed before normal data communication commences over the passive cable. Via this low-level communication, the subsystems may exchange unique IDs associated with their respective signal driver/receivers. Then, each subsystem may send its local unique ID and the received remote unique ID to a high-level management tool (HLMT) such that the HLMT can discover that the first subsystem and second subsystem are connected via the passive cable.

Because existing signal driver/receivers are used to drive signals over the passive cable, no active cable is required. Thus, no additional component or circuitry is needed to read a tag on an active cable. Nor is any additional piece of test equipment needed to drive an endpoint identifier over the cable for connection discovery purposes. In the present disclosure, it may be the case that the low-level signals in the signal driver/receiver are available "off the shelf," and these low-level signals may be accessed to drive signals over the cable. Thus, as long as a subsystem includes a single driver/receiver, it may take advantage of the solutions described herein. Still, even though an active cable is not required, by the exchange of identifiers (described in detail below), a high-level management tool is able to, in effect, create a single connection identifier for each end of the passive cable, and then compare these to determine that a connection exists.

FIG. 1 is a block diagram of an example system 100 for discovering connection of passive cables. System 100 may include two or more subsystems, and it may be desirable to connect a particular two of the subsystems (e.g., 110, 120) with a passive cable 140 such that the two subsystems can communicate with each other (e.g., network type communications). System 100 may include an administrator 130 that may be connected to any number of the subsystems in system 100, for example, to at least subsystem 110 and 120 as shown in FIG. 1. In some examples, system 100 may include a single enclosure (e.g., rack, chassis, etc.), and in other examples, system 100 may include multiple enclosures (e.g., with some subsystems in one enclosure and other subsystems in another enclosure). In the example of multiple enclosures, a single administrator (e.g., 130) may still be connected to and may still manage the multiple subsystems of system 100. In the example of multiple enclosures, a subsystem in one enclosure may still be connected (e.g., with a passive cable such as 140) to a subsystem in another enclosure.

Administrator 130 may be a computing device (e.g., a computing board or a module that plugs into a section of an enclosure such as a chassis) that allows for management of multiple subsystems from a common location, or even remotely. Administrator 130 may include its own processor and machine-readable storage medium for storing instructions executable by the processor. Administrator 130 (e.g., in conjunction with various local management processors such as 114 in the subsystems) may allow for performing various tasks with respect to the subsystems, for example, power up, reset, mounting drives, log viewing, and many more. In some examples, administrator 130 may be an onboard administrator. Administrator 130 may include a high-level management tool (HLMT) 132 that provides the bulk of the management functionalities just mentioned. HLMT 132 may include instructions (e.g., stored on the machine-readable storage medium) that, when executed (e.g., by the processor), implement the functionality of the HLMT. Alternatively or in addition, HLMT 132 may include electronic circuitry (i.e., hardware) that implements the functionality of the HLMT.

Subsystem 110 may be any type of computing device or multiple computing devices that are in communication with each other (e.g., via at least one connector or network) and are presented as a unified subsystem. Examples of subsystems include servers (e.g., blades), enclosures (e.g., chassis, racks), switches (and other networking components) and various other subsystems. Each subsystem of system 100 may be similar in many respects to subsystem 100. Thus, for simplicity, for the most part, only subsystem 100 will be described as an example subsystem, and it should be understood that other subsystems (e.g., 120) may include similar components and may operate in a similar manner.

Subsystem 110 may include a signal driver/receiver 112. Subsystem 110 may include a connection discovery engine 115, for example, implemented in a local management processor 114. It should be understood, however, that in other examples, connection discovery engine 115 may be implemented elsewhere, for example, in signal driver/receiver 112. In the examples where connection discovery engine 115 is implemented in local management processor 114, as shown in FIG. 1, signal driver/receiver 112 may be in communication with local management processor 114, for example, via various I/O and chipset interconnects 118. In this example, via local management processor 114, signal driver/receiver 112 may be in communication with administrator 130 (and with high-level management tool 132). It should be understood that signal driver/receiver 112 may be in communication with administrator 130 via some other path (e.g., circuits, interconnects, etc.) that does not go through a local management processor.

Local management processor 114 may be any type of management processor, for example, such as integrated lights-out (iLO), lights out manager or other type of out-of-band manager. Local management processor 114 may allow an administrator (e.g., 130) to perform various tasks with respect to the particular subsystem 110, for example, power up, reset, mounting drives, log viewing, and many more. Local management processor 114 may include its own processor and machine-readable storage medium for storing instructions executable by the processor. Local management processor 114 may be connected to signal driver/receiver 112 (e.g., via I/O and chipset interconnects 118). Local management processor 114 may (e.g., via firmware and/or software running on local management processor) be able to "see" signal driver/receiver 112, and may be able to access certain low-level power up/down controls of signal driver/receiver 112. These low-level controls are described in more detail below.

Signal driver/receiver 112 may be connected to passive cable 140, for example, via connector 116. Connector 116 may be a passive connector whose main purpose may be for mechanical cable connection.

Passive cable 140 may also be connected (e.g., manually by a data center operator) to another signal driver/receive (e.g., 122) in another subsystem (e.g., 120). Passive cable 140 may include at least one "line" (e.g., fiber, metal wire, etc.), where each line provides a single-bit data connection. The present disclosure will focus primarily on cable connection discovery using the same lines of passive cable 140 that are used for "normal data communication." In other words, the purpose of passive cable 140 (which connects subsystem 110 to subsystem 120) may be for the two subsystems to communicate data back and forth (e.g., network type communication). The present disclosure may use these same lines that are used for normal data communication for discovering that passive cable 140 has been connected between two subsystems (e.g., 110, 120). Thus, this type of connection discovery may be referred to as "in-band," as opposed to out of band where additional lines or paths may be added to support connection discovery. More broadly, this in-band concept may continue beyond the passive cable 140 itself. There may be a data communication path (e.g., 141 in FIG. 1), used for normal data communication, between signal driver/receiver 112 and signal driver/receiver 122. This path may include at least one line in passive cable 140 and also associated lines at the input/output of the signal driver/receivers and their associated connectors (e.g., 116). This same data path may be used for the low-level communications that are used for connection discovery, as described herein.

Passive cable 140, in various examples, may be different types of passive cables. For example, cable 140 may be an optical cable, in which case each line may be an optical fiber. Alternatively, passive cable 140 may include at least one metal line, for example, made of copper or other conductive metal. The type of passive cable used may determine what type of signal driver/receiver (e.g., 112) is used.

Signal driver/receiver 112 is able to drive signals (e.g., electrical signals, optical signals, etc.) across the at least one line of passive cable 140 and is able to detect signals sent to it across passive cable 140. If passive cable 140 is electrical (e.g., with metal lines), signal driver/receiver 112 may be an electrical signal driver/receiver. If passive cable 140 is optical, signal driver/receiver 112 may be an optical signal driver/receiver such as, for example, an electrical/optical engine (EO engine). An EO engine is a computer circuit that drives and receives optical signals, and may also convert electrical signals to optical signals and vice versa, for example, to interface between an optical passive cable (e.g., cable 140) and a larger electrical circuit.

Signal driver/receiver 112 may include its own processor and machine-readable storage medium for storing instructions executable by the processor. In some examples of the present disclosure (e.g., such as where connection discovery engine 115 is implemented in a local management processor 114), signal driver/receiver 112 may be more or less "off the shelf." Here, off the shelf means that whatever signal driver/receive is in subsystem 110 may be used to implement the solutions described herein without modification, as long as the signal driver/receive meets some requirements (see discussion of low-level power up/down controls below). This is, in fact, a significant benefit of the present disclosure, that existing signal driver/receivers (e.g., commonly used signal driver/receivers) and existing passive cables (e.g., commonly used passive cables) can be used to implement the solutions described herein.

Signal driver/receiver 112 may provide some low-level power up/down controls. These low-level controls may be hardware pins that are accessible external or internal to signal driver/receiver 112. In other examples, these low-level controls may not be directly associated with particular hardware pins. Via these controls, other components of subsystem 110 (e.g., local management processor 114) may be able to cause signal driver/receiver 112 to power up or power down. Additionally, via these controls, other components of subsystem 110 may be able to determine when signal driver/receive 112 is or is not receiving any sort of signal at its input/output. This input/output, in the example of FIG. 1, is depicted where signal driver/receiver 112 connects, e.g., via connector 116, to passive cable 140. In some examples where connection discovery engine 115 is implemented in signal driver/receiver 112, these low-level controls may be accessed from within signal driver/receiver 112 by connection discovery engine 115. It should be understood that the low-level power up/down controls, as referred to herein, are not limited to any type of physical control pins or the like. Instead, they should be interpreted as any manner for turning the signal driver/receiver on and off, and detecting the same. Thus, the use of the term "control" or the like should not be construed as limiting.

Signal driver/receiver 112, when it is powered up, but before normal data communication starts, may provide some sort of signal at its output. Such a signal may be a continuous logic '1' (high power state). Other power-on signal options are possible. Signal driver/receiver 112, when it is powered down or off, may provide no signal, for example, zero power at its output. Zero power may be a lower power level than the logic '0' used during normal data communication. Other power-off signal options are possible. At least one of the low-level power up/down controls (e.g., an "enable" control or a "disable" control) may be used to power up signal driver/receiver 112, thus causing a certain signal (e.g., continuous logic '1') or may be used to power down signal driver/receiver 112, thus causing a no signal (e.g., zero power). As one example, at least one of these low-level power up/down controls may be used to modulate or toggle signal driver/receiver 112 between a high power and zero power output state, in order to send signals (e.g., a multi-bit message or identifier) over at least one line of passive cable 140. One example benefit of modulating between a high power and zero power state is that this does not required the discrimination of two relatively close logic voltages (i.e., logic '1' versus logic '0'), like those used for normal data communication. Another example benefit is that the same power level threshold detection circuits in the signal receiver that are used to detect loss of signal may be reused. Another example benefit is that an unmodified signal driver may be used for both normal data communication and for sending unique Ds. In one example, local management processor 114 (e.g., via connection discovery engine 115) may cause the modulation described above. In other examples, a connection discovery engine implemented in signal driver/receiver 112 may cause such modulation.

Such a modulated signal may be interpreted by the amounts of time that the power level of a line is high power vs. zero power, for example. Thus, in effect, at least one line of passive cable 140 may act as a serial communication line where the high power state is a logic '1' and the zero power state is a logic '0'. In order for signals to be sent and received in the serial manner described, each end of the passive cable (e.g., in connection discovery engine 115) may need to use a common signal cycle time so that it can be determined how many '0' and '1' bits are sent over a certain timeframe, in order to generate and decipher a multi-bit message or identifier (e.g., the beacons and unique IDs discussed herein). It should be understood that this high-power and zero-power communication "protocol" may be used during cable connection discovery only, and different power levels and protocols may be used during normal data communication.

Signal driver/receiver 112, when no signal (zero power) is present at its input, may assert or de-assert (depending on configuration) at least one of the low-level power up/down controls (e.g., a loss-of-signal (LOS) control). As one example, at least one of these low-level power up/down controls may be used to monitor the timing of transitions between when no signal (zero power) is present at its input and when there is a signal. In this manner, even before normal data communication over passive cable 140 begins, at least one of these low-level power up/down controls may be used to receive signals over at least one line of passive cable 140. For example, if signal driver/receiver 112 is used to toggled between a high power and no power state to send a signal (as described above), then signal driver/receiver 122 may be used to receive this signal by monitoring the timing of transitions between when no signal (zero power) is present at its input and when there is a signal, and likewise if signal driver/receiver 122 sends a signal to signal driver/receiver 112. In one example, local management processor 114 (e.g., via connection discovery engine 115) may monitor such transitions to receive signals. In other examples, a connection discovery engine implemented in signal driver/receiver 112 may monitor such transitions to receive signals.

As mentioned herein, passive cable may include one line or multiple lines. In various examples with multiple lines, the low-level power up/down controls of the signal driver/receiver may control or drive these multiple lines in various ways. For example, a single enable or disable control may cause the signal driver/receiver to control all the lines at once (e.g., all switching to high power or no power together). Alternatively, each line may be controlled separately. For example, a signal driver/receiver may have an enable or disable register with enough bits to account for each line. Various other ways of controlling multiple lines may exist as well. Likewise, a loss-of-signal (LOS) control may make a "signal lost" determination for all of the lines together (e.g., all lines must have a loss of signal, or any one of the lines has a loss of signal). Alternatively, each line could have its own LOS control. For simplicity, various descriptions herein may refer to a single enable or disable control and a single LOS control which presumably control or interpret all the lines together. However, it should be understood that other contemplated embodiments cover these other control situations just described.

The descriptions provided above of using low-level power up/down controls to send and receive signals is an example of communicating via the physical layer. The term "physical layer" (or PHY) refers to part of the Open Systems Interconnection (OSI) model, which is a model that characterizes and standardizes the internal functions of communication systems. The physical layer of the OSI model is the first or lowest layer. The physical layer consists of the basic networking hardware transmission technologies of a network. The physical layer defines the means of transmitting raw bits rather than logical data packets over a physical link. In the above examples, because low-level power up/down controls are used to send signals by powering up and power down signal driver/receiver 112, such signals are sent without regard to whatever communication protocol the signal driver/receiver 112 uses once it is operating in its normal data communication mode. This is a significant benefit of the present disclosure, that the solutions described herein may be used to discover when passive cables are connected, irrespective of the communication protocol used by the signal driver/receiver during its normal data communication mode.

Connection discovery engine 115 may access the low-level power up/down controls of signal driver/receiver 112 described above. Connection discovery engine 115 may be implemented in local management processor 114, in which case, connection discovery engine 115 may access the low-level controls via local management processor 114. In alternate embodiments, connection discovery engine 115 may be implemented in signal driver/receiver 112 and may access the low-level power controls internal to signal driver/receiver 112. Thus, in these embodiments, these low-level controls may not need to be accessible external to the signal driver/receiver 112 (e.g., no external connections). In yet other embodiments, connection discovery engine 115 may be implemented in other locations, for example, in high-level management tool 132, or elsewhere in subsystem 110.

Connection discovery engine 115 may include instructions (e.g., stored on a machine-readable storage medium) that, when executed by a processor, implement the functionality of connection discovery engine 115. Such machine-readable storage medium and processor may be the ones located in local management processor 114, e.g., in the example where connection discovery engine 115 is implemented in local management processor 114. Alternatively, such machine-readable storage medium and processor may be the ones located in signal driver/receiver 112, e.g., in the example where connection discovery engine 115 is implemented in signal driver/receiver 112. Alternatively, such machine-readable storage medium and processor may be yet other ones, for example, located in administrator 130 or elsewhere in subsystem 110. In some examples, instead of, or in conjunction with, connection discovery engine 115 being instructions executed by a processor, connection discovery engine 115 may include electronic circuitry (i.e., hardware) that implements the functionality of connection discovery engine 115.

Connection discovery engine 115 may be responsible for causing low-level power up/down controls of signal driver/receiver 112 to modulate to send signals (for cable connection discovery purposes) and to monitor timings of transitions on low-level power up/down controls to receive signals. In order to provide a clearer description of connection discovery engine 115, various descriptions herein may refer to the connection discovery engine 115 "sending" and "receiving." It should be understood that in order to send and receive, connection discovery engine 115 may modulate these low-level controls (send) and monitor timings of transitions on these low-level controls (receive). Additionally, it should be understood that sending refers to causing one signal driver/receiver (e.g., 112) to send signals (e.g., multi-bit messages or identifiers) over passive cable 140 to another signal driver/receiver (e.g., 122) in another subsystem, and likewise in reverse for receiving.

Connection discovery engine 115 may send a unique identifier (ID) (i.e., local unique ID) associated with signal driver/receiver 112. Likewise, connection discovery engine 115 may receive a unique ID (i.e., remote unique ID) associated with another signal driver/receiver (e.g., 122) in another subsystem connected by passive cable 140. In other words, subsystems 110 and 120 (via their connection discovery engines) may exchange local unique IDs. These IDs may be used to produce, on each end of cable 140, a single connection identifier that indicates the connection of subsystem 110 to subsystem 120. Then, high-level management tool 132 may compare the single connection identifiers from subsystem 110 and subsystem 120 to determine that these two subsystems are connected (by passive cable 140). More details about creating this single connection identifier are provided below.

Connection discovery engine 115 may determine the local unique ID in various ways. For example, it may query signal driver/receiver 112 for this ID. In these examples, signal driver/receiver 112 may need to be able to store and communicate a unique ID to other components of subsystem 110. Various "off the shelf" signal driver/receivers may have this capability. Connection discovery engine 115 may communicate its local unique ID and the received remote unique ID to high-level management tool 132 (e.g., via local management processor 114). Connection discovery engine 115 may send these Ds as the single connection identifier, or the single connection identifier may be created in HLMT 132 after receiving the local and remote unique IDs.

High-level management tool (HLMT) 132 may receive or create a single connection identifier for each end of cable 140 (i.e., for subsystem 110 and subsystem 120). The single connection identifiers uniquely identify the connection of subsystem 110 to subsystem 120. The single connection identifier may be created by combining the local unique Ds of each subsystem (each associated with the signal driver/receiver in each subsystem). For example, for subsystem 110, HLMT 132 may receive, from connection discovery engine 115, a local unique ID and a remote unique ID, and may concatenate these two IDs to create a first single connection identifier. Then, for subsystem 120, HLMT 132 may receive, from the connection discovery engine in subsystem 120, a local unique ID and a remote unique ID, and may concatenate these two IDs to create a second single connection identifier. HLMT 132 may then compare the first and the second single connection identifier, and if they match, HLMT 132 may determine that subsystem 110 is connected to subsystem 120 (by passive cable 140).

In order to perform matching of single connection identifiers, HLMT 132 may flip the local and remote unique IDs received from one of the subsystems. For example, if HLMT 132 receives, respectively, local and remote Ds of "123" and "789" from subsystem 110, and receives, respectively, local and remote IDs of "789" and "123" from subsystem 120, HLMT may need to flip the IDs from one of the subsystems, for example, to get a consistent ID ordering. Thus, for example, HLMT could flip the IDs received from subsystem 120 to get "123789," and then the single connection identifiers would match. Such concatenation and/or ID flipping described above could be done either in HLMT 132 or in the subsystems before sending to HLMT. Other manners of discovering a match given potentially different orderings of unique ideas maybe used as well.

Connection discovery engine 115 may also send connection probes or "beacons" using the same low-level controls described above. Likewise, connection discovery engine 115 may receive connection probes or "beacons" using the same low-level controls described above. Beacons may be used to determine that there is some device connected on the other end of passive cable 140. A connection discovery engine (e.g., 115) may determine that another subsystem is connected over passive cable 140 before it begins the routine of exchanging unique local IDs. In some examples, as soon as subsystem 110 (specifically, connection discovery engine 115 and signal driver/receiver 112) is powered up, it may automatically start to send beacons and start to listen for beacons. Even when subsystems are started up, beacons may not successfully travel between subsystems, for example, if passive cable 140 is not yet connected. However, the process of sending and listening for beacons may continually run such that it is ready to send and receive beacons when cable 140 is connected. Thus, as soon as passive cable 140 is connected between subsystem 110 and 120, each subsystem may start to send and receive beacons.

In some situations, signal driver/receiver 112 may be sending beacons while there is no subsystem connected to the other end of passive cable 140. In these situations, if signal driver/receiver 112 is optical (e.g., an EO engine) and if passive cable 140 is optical, as beacons are sent, light or laser beams may be shooting out of the non-connected end of passive cable 140. There is a risk that these light or laser beams may be damaging to humans, for example, to eyes. Thus, in some optical examples, the beacons (and perhaps other types of signals) may be low power. A low power optical signal may be created by modulating the signal driver/receiver (e.g., between high power and zero power) such that the amount of time that the high power state is on is limited. For example, beacons may be created by using a simple toggling pattern for several bit times. An optical signal could also be limited in power by limiting the number of lines (in a multi-line cable) that are high power at any one time. In short, in some embodiments, low power optical beacons may be used.

Figure 2:
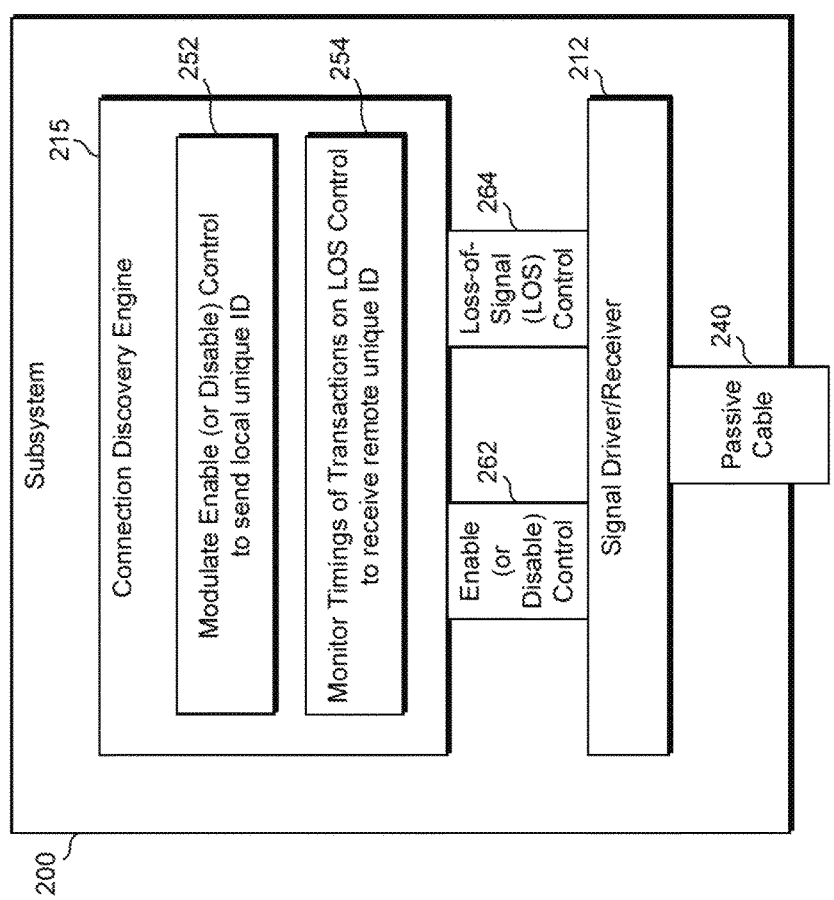
FIG. 2 is a block diagram of an example subsystem to enable discovering connection of passive cables.

FIG. 2 is a block diagram of an example subsystem 200 to enable discovering connection of passive cables. Subsystem 200 may be similar to subsystem 110 or subsystem 120, for example. Thus, in some examples, subsystem 200 as described herein may describe how subsystem 110 works and equally or similarly how subsystem 120 works. In some specific examples, a first subsystem similar to subsystem 200 may be connected (or connectable) by a passive cable 240 (e.g., similar to passive cable 140) to a second subsystem similar to subsystem 200.

Subsystem 200 may include a signal driver/receiver 212 (e.g., similar to 112) and a connection discovery engine 215 (e.g., similar to 115 of FIG. 1). Signal driver/receiver 212 is capable of sending and receiving data and signals over a passive cable. Connection discovery engine 215 may access low-level power up/down controls of signal driver/receiver 212. Specifically, connection discovery engine 215 may access a low-level enable or disable control (262) of signal driver/receiver 212 and a low-level loss-of-signal (LOS) control (264) of the signal driver/receiver 212. The enable or disable control 262 and the LOS control 264 may be hardware pins that are accessible external or internal to signal driver/receiver 212. In other examples, these low-level controls may not be directly associated with particular hardware pins. Connection discovery engine 215 may modulate the enable or disable control to send a local unique ID of signal driver/receiver 212 over passive cable 240, as shown by label 252. Additionally, connection discovery engine 215 may monitor timings of transitions on the LOS control to receive, over passive cable 240, a remote unique ID of a signal driver/receiver in a second subsystem connected by passive cable 240, as shown by label 254. It should be understood that the low-level enable or disable control and the low-level loss-of-signal (LOS) control, as referred to herein, are not limited to any type of physical control pins or the like. Instead, they should be interpreted as any manner for turning the signal driver/receiver on and off, and detecting the same. Thus, the use of the term "control" or the like should not be construed as limiting.

Connection discovery engine 215 may also determine when one or both ends of passive cable 240 are unplugged (e.g., after both ends being plugged in for some time). When connection discovery engine 215 sees zero power at its input, this could mean that the signal driver/receive in the connected subsystem has intentionally been disabled (e.g. by a connection discovery engine of that subsystem modulating an enable/disable control), or it could mean that there is no subsystem connected to the other end of the passive cable. To distinguish between these, connection discovery engine 215 may implement a timeout period (e.g., called "unplug delay"). If connection discovery engine 215 sees zero power for less than the unplug delay, it may assume this zero power is part of a low-level signal (e.g., a unique ID or beacon). If connection discovery engine 215 sees zero power for more than the unplug delay, it may assume that the subsystem on the other end of the passive cable has been disconnected or unplugged.

Figure 3:
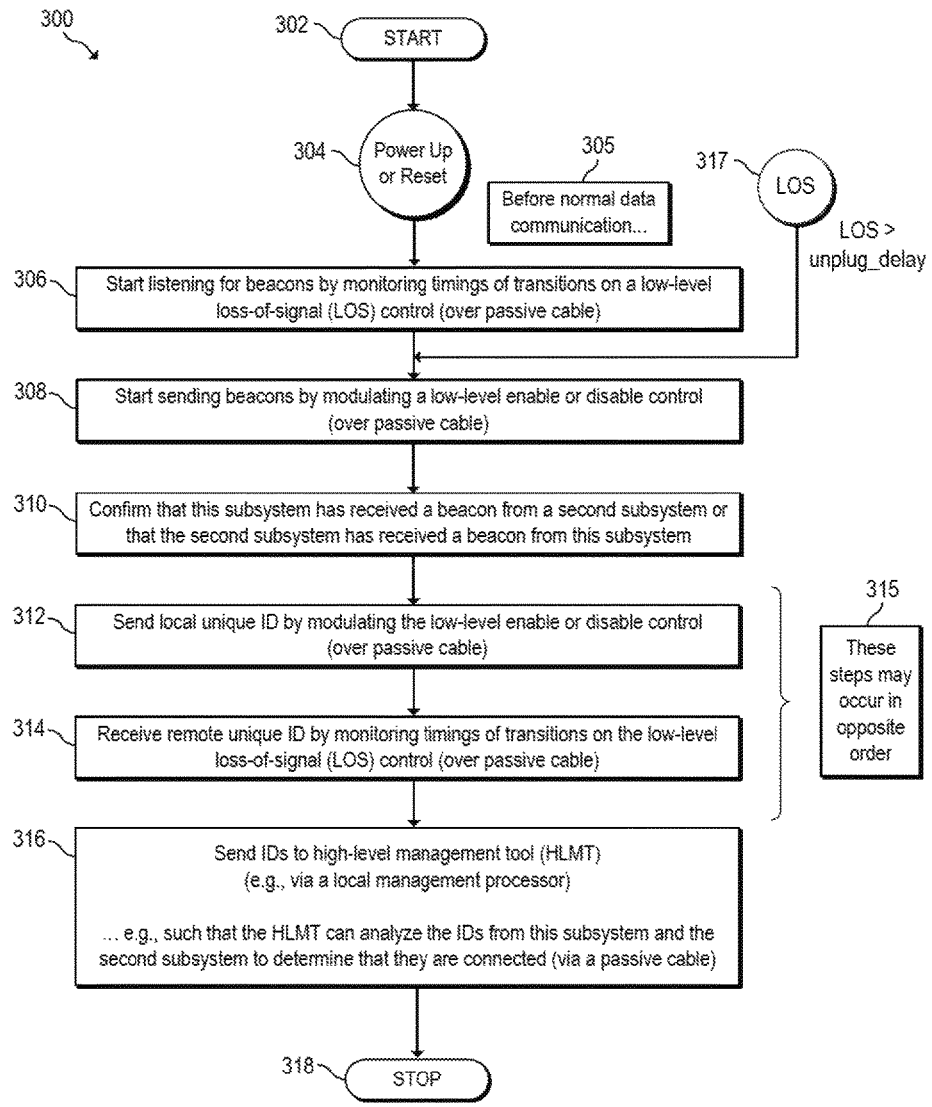
FIG. 3 is a flowchart of an example method for discovering connection of passive cables.

FIG. 3 is a flowchart of an example method 300 for discovering connection of passive cables. Method 300 may be described below as being executed or performed by a subsystem, for example, subsystem 110 or 120 of FIG. 1 or subsystem 200 of FIG. 2. While method 300 may be described as relating to one subsystem (e.g., 110) of a larger system, other subsystems (e.g., 120) within that system may operate in a similar manner. Method 300 may substantially be executed by a connection discovery engine (e.g., 115 or 215) of the subsystem. Other suitable systems or subsystems may be used as well.

Method 300 may be implemented in the form of executable instructions stored on at least one machine-readable storage medium of the subsystem and executed by at least one processor of the subsystem. For example, if the connection discovery engine is implemented in a local management processor (e.g., 114), the machine-readable storage medium that stores the instructions and the processor that executes the instructions may be part of the local management processor. In other examples, if the connection discovery engine is implemented in the signal driver/receiver (e.g., 112), the machine-readable storage medium that stores the instructions and the processor that executes the instructions may be part of the signal driver/receiver. Alternatively or in addition, method 300 may be implemented in the form of electronic circuitry (e.g., hardware). In alternate embodiments of the present disclosure, one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where components of the subsystem (e.g., connection discovery engine 115/215 and signal driver/receiver 112/212) may power up or reset. Note 305 shown in FIG. 3 indicates that the remainder of the steps (related to connection discovery) in method 300 may occur before normal data communication occurs (e.g., data communication over passive cable 240 that is related to the ultimate purpose of passive cable 240). At step 306, the subsystem (e.g., via connection discovery engine 115) may start listening for beacons to detect the presence of another subsystem connected to the passive cable (e.g., 140). Such listening for beacons may be done, as described above, by monitoring timings of transitions on a low-level loss-of-signal (LOS) control. This step of listening for beacons (which may be ongoing at times) may be referred to as a "receive beacon" task. At step 308, the subsystem (e.g., via connection discovery engine 115) may start sending beacons to detect the presence of another subsystem connected to the passive cable (e.g., 140). Such sending of beacons may be done, as described above, by modulating a low-level enable or disable control. This task of sending beacons may be ongoing at times. At step 310, the subsystem (e.g., via connection discovery engine 115) may confirm that this subsystem has received a beacon from a second subsystem (connected via the passive cable) or that the second subsystem has received a beacon from this subsystem. Such confirmation may be performed by sending or receiving "ACK" (short for acknowledge) signals over the passive cable in a similar manner to how other signals are sent over the passive cable during for connection discovery.

At step 312, the subsystem (e.g., via connection discovery engine 115 and signal driver/receiver 112) may send its local unique ID (to the other subsystem over the passive cable) by modulating the low-level enable or disable control. The sending of this unique ID may be done in response to the subsystem receiving an ACK that the other subsystem received its beacon, or in response to this subsystem receiving a remote unique ID from the other subsystem (in which case, step 314 may occur before step 312). At step 314, the subsystem (e.g., via connection discovery engine 115 and signal driver/receiver 112) may receive a remote unique ID (from the other subsystem over the passive cable) by monitoring timings of transitions on the low-level loss-of-signal (LOS) control. The receiving of this unique ID may occur in response to the subsystem ACK'ing to the other subsystem that it received a beacon from the other subsystem, or in response to this subsystem sending its local unique ID to the other subsystem.

At step 316, the subsystem (e.g., via connection discovery engine 115) may send its local unique ID and the received remote unique ID to a high-level management tool (HLMT) (e.g., 132). For example, as described above, these IDs may be sent via a local management processor in the subsystem or otherwise. The IDs may be sent to the HLMT such that it may analyze the IDs from this subsystem and the second subsystem to determine that the subsystems are connected (via the passive cable). Such a determination may be made in a manner similar to that described above, for example, by concatenating local and remote IDs sent from each subsystem to create a single connection identifier for each subsystem (e.g., flipping the local and remote IDs for one of the subsystems), and then comparing the single connection identifiers.

At reference number 17 of FIG. 3, it can be seen that if at any time the LOS control is asserted for more than the unplug delay (timeout period), the subsystem may assume that the second subsystem on the other end of the passive cable has been disconnected or unplugged, as described in more detail above. If this occurs, method 300 may jump to step 308 to start sending beacons again, and method 300 may proceed from there. Method 300 may eventually continue to step 318, where method 300 may stop.

Figure 4A:
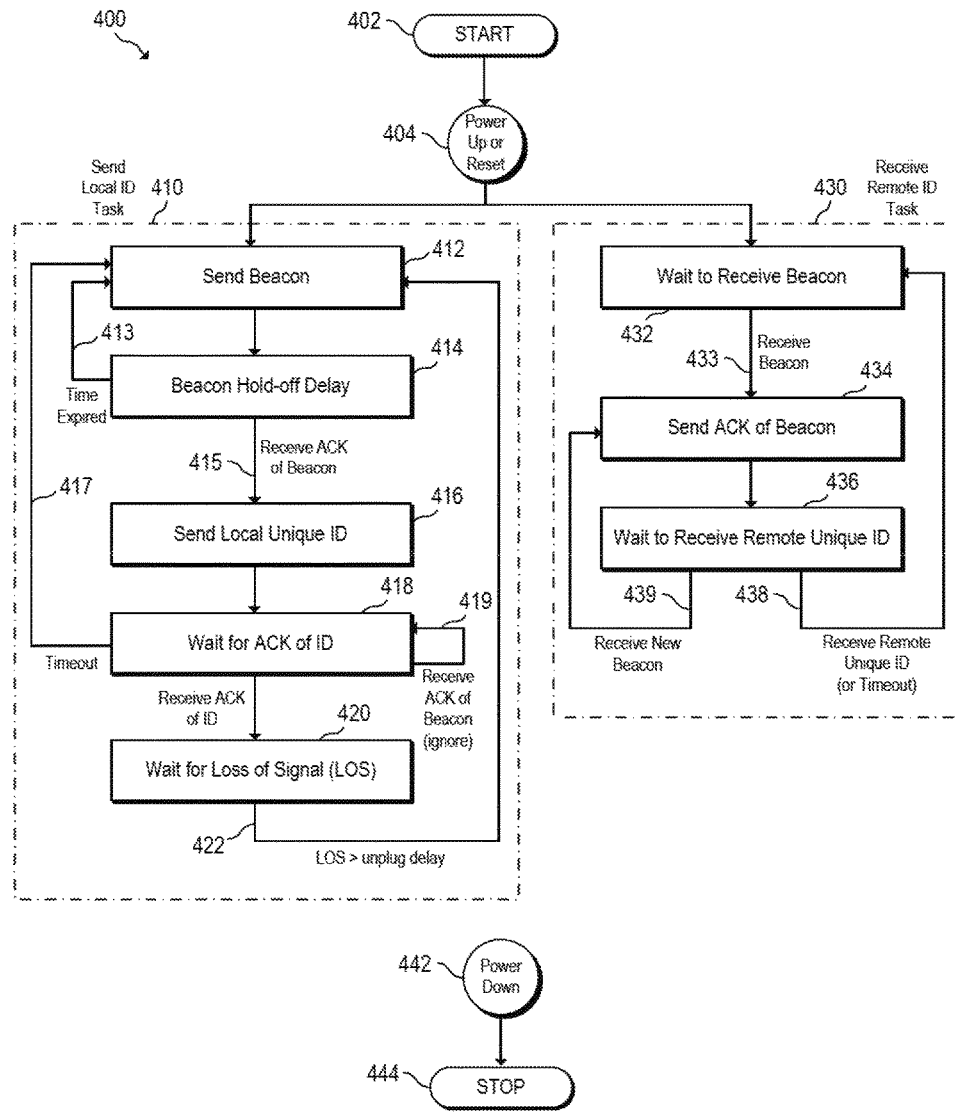
FIG. 4A is a flowchart of an example method for discovering connection of passive cables.

FIG. 4A is a flowchart of an example method 400 for discovering connection of passive cables. Method 400 may be considered as a more detailed version of at least part of method 300 where various details of sending/receiving beacons and sending/receiving unique Ds are shown. Method 400 may be described below as being executed or performed by a first subsystem, for example, subsystem 110 or 120 of FIG. 1 or subsystem 200 of FIG. 2. While method 400 may be described as relating to one subsystem (e.g., 110) of a larger system, other subsystems (e.g., 120) within that system may operate in a similar manner. Method 400 may substantially be executed by a connection discovery engine (e.g., 115 or 215) of the subsystem. Other suitable systems or subsystems may be used as well.

Method 400 may start at step 402 and continue to step 404, where components of the first subsystem may power up or reset. After step 404, multiple sub-routines or tasks (410, 430) may start (e.g., automatically). These tasks, once started, may run more or less concurrently and continuously (e.g., until power down). In some examples, these tasks (the send local ID task, and the receive local ID task) may be separate sub-routines that run substantially independent of each other.

As part of the "send local ID" task (410), the first subsystem may periodically send a beacon (e.g., by modulating the low-level enable or disable control), wait a defined amount of time (i.e., a beacon hold-off delay), then send another beacon, and so on. This send beacon subroutine can be seen in FIG. 4A by the progression from step 412 to step 414, and then back to step 412 via path 413. Accept for this subroutine being paused or interrupted at times, it may be the case that the first subsystem is more or less continuously sending beacons. At various times, the first subsystem may receive an ACK from the second subsystem indicating that the second subsystem received a beacon sent from the first subsystem. In response to this ACK, the first subsystem may send its local unique ID to the second subsystem. This can be seen in FIG. 4A by the progression via path 415 to step 416. It should be understood that the first subsystem may not need to wait the full beacon hold-off delay (at step 414) before proceeding to step 416 if an ACK of a beacon is received.

Once the first subsystem sends its local unique ID (step 416), it may wait (step 418) for an ACK from the second subsystem that the ID was received. At this point, if this wait times out (path 417), method 400 may return to again start sending beacons (step 412). While the first subsystem is waiting for an ACK that its ID was received (step 418), the first subsystem may instead receive an ACK that the second subsystem received another beacon from the first subsystem. This may occur if the delay (beacon hold-off delay) is short enough and the transmission delay between the first and second subsystem is long enough such that the first subsystem sends a second beacon before it receives an ACK that the second subsystem received the first beacon. In order to handle this timing situation, the first subsystem may ignore the second ACK indicating that the second subsystem received the second beacon. This can be seen in FIG. 4A by path 419 where if the first subsystem is waiting for an ACK of its local unique ID (step 418), meaning it has already received an ACK of a first sent beacon, then it may ignore an ACK of a second sent beacon. If while at step 418, the first subsystem receives the ACK of its ID, then task 410 may proceed to step 420.

At step 420, the subsystem may wait for a loss-of-signal (LOS). If the low-level LOS control is asserted for more than an unplug delay (e.g., a defined period of time) (indicated by event 422 in FIG. 4), the first subsystem may assume that the second subsystem on the other end of the passive cable has been disconnected or unplugged, as described in more detail above. If this occurs while at step 420, task 410 may return to sending beacons at step 412. It should be understood that step 420 is not the only step where LOS may be detected. In some examples, at any time during the execution of task 410, if the LOS control is asserted longer than the unplug delay, task 410 may return to sending beacons at step 412. Thus, path 422 as depicted in task 410 should not be construed as limiting.

As part of the "receive remote ID" task (430), the first subsystem may more or less continuously listen for beacons from a second subsystem, for example, by monitoring timings on the low-level LOS control. At step 432, the first subsystem may wait to receive a new beacon. When the first subsystem receives a beacon from the second subsystem (shown by path 433 in FIG. 4A), the first subsystem will then reply with an "ACK" (shown by step 434) to the second subsystem to confirm that it received the beacon. After sending this ACK, the first subsystem may wait for the second subsystem to send its unique ID (remote unique ID), as is shown at step 436. If this wait times out (depicted as an option on path 438 of FIG. 4A), task 430 may return to listening for a new beacon at step 432. While at step 436, the first subsystem may receive the remote unique ID it is waiting for. If this occurs, then, similarly, task 430 may return to listening for a new beacon at step 432. In some situations, while the first subsystem is waiting for a remote unique ID at step 436, it may receive instead a new beacon. In this case, task 430 may return to step 434 where the first subsystem may send an ACK that it received a new beacon, and then the task will go back to waiting to receive a remote unique ID (step 436).

Method 400 may eventually continue to step 444, where method 400 may stop. For example, method 400 may stop when the first subsystem (or components of the subsystem) is powered down (shown by event 442).

Figure 4B:
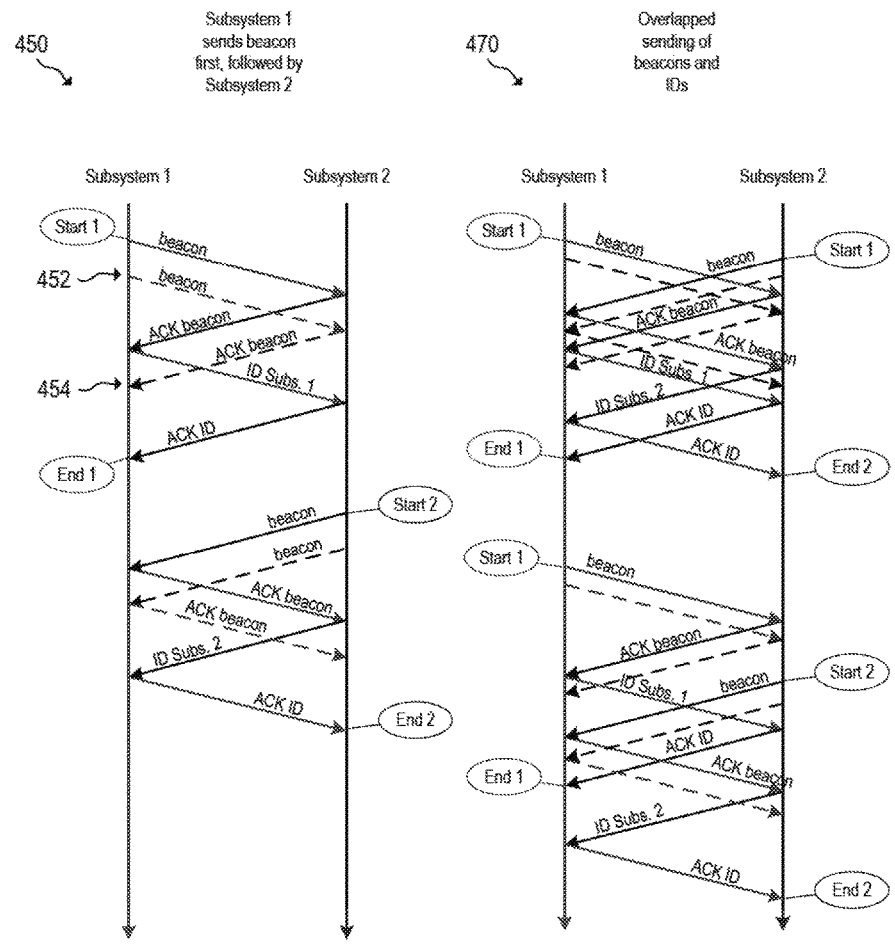
FIG. 4B shows two example send/receive diagrams that show various pieces of information traveling back and forth between a first subsystem and a second subsystem.

FIG. 4B shows two example send/receive diagrams (450, 470) that show various pieces of information traveling back and forth between a first subsystem (subsystem 1) and a second subsystem (subsystem 2). FIG. 4B can be considered an extension of FIG. 4A, where the first and second subsystems may operate in a manner similar to that shown in FIG. 4A to send and receive information. In FIG. 4B, it can be seen that the first subsystem may send a beacon and receive an ACK for that beacon, as described above. Then, after receiving the ACK, the first subsystem may send its local unique ID, and finally receive an ACK of that ID. Subsystem 2 may proceed in a similar manner. Once each subsystem has completed the process of sending its local unique ID and receiving a remote unique ID (see "start" and "end" notes in FIG. 4B for each subsystem), then the exchange of unique IDs may be complete.

FIG. 4B also illustrates the situation explained above where the first subsystem may ignore a second ACK of a beacon from the second subsystem (see notes 452, 454 in FIG. 4B). In this kind of situation, the first subsystem may send a second beacon (note 452) before the first subsystem receives an ACK that a first beacon has been received. Then, the second subsystem will still send an ACK of the second beacon, but the first subsystem may ignore this ACK (see note 452).

Diagrams 450 and 470 are similar, but illustrate different example scenarios. Diagram 450 shows a scenario where subsystem 1 completes the full process of sending a beacon, sending its local unique ID (and receiving an ACK for each) before subsystem 2 does the same on its end. Diagram 470 shows a scenario where subsystem 1 and subsystem 2 overlap in these processes. Diagram 470 is shown to make it clear that this overlap situation may be handled by the solutions described herein in essentially the same manner as the situation in diagram 450 because the "send local ID" tasks (e.g., task 410 shown in FIG. 4A) and the "receive remote ID" tasks (e.g., task 430 shown in FIG. 4B) may be separate sub-routines that run concurrently with each other and independent of each other.

Figure 5:
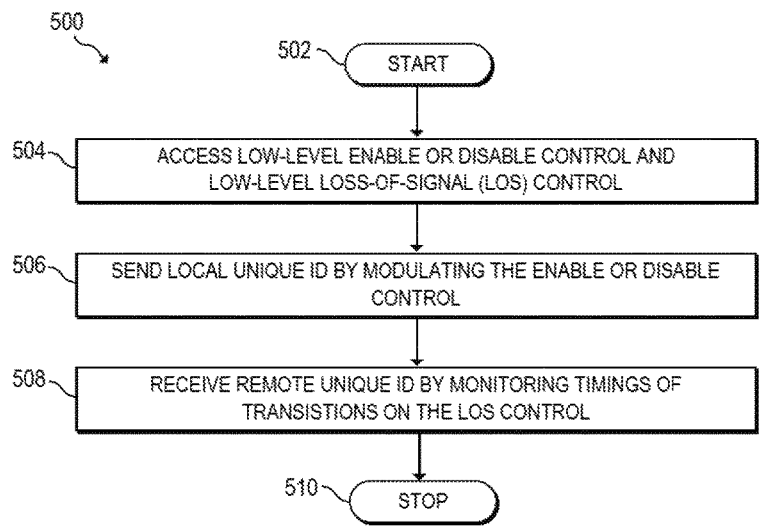
FIG. 5 is a flowchart of an example method for discovering connection of passive cables.

FIG. 5 is a flowchart of an example method 500 for discovering connection of passive cables. Method 500 may be described below as being executed or performed by a subsystem, for example, subsystem 600 of FIG. 6, subsystem 110 of FIG. 1 or subsystem 200 of FIG. 2. Other suitable systems and/or computing devices may be used as well. Method 500 may be implemented in the form of executable instructions stored on at least one machine-readable storage medium of the subsystem and executed by at least one processor of the subsystem. Alternatively or in addition, method 500 may be implemented in the form of electronic circuitry (e.g., hardware). In alternate embodiments of the present disclosure, one or more steps of method 500 may be executed substantially concurrently or in a different order than shown in FIG. 5. In alternate embodiments of the present disclosure, method 500 may include more or less steps than are shown in FIG. 5. In some embodiments, one or more of the steps of method 500 may, at certain times, be ongoing and/or may repeat.

Method 500 may start at step 502 and continue to step 504, where the subsystem may access a low-level enable or disable control of a signal driver/receiver in the first subsystem and a low-level loss-of-signal (LOS) control of the signal driver/receiver. The signal driver/receiver may be capable of sending and receiving data and signals over a passive cable. At step 506, the subsystem may send a local unique ID of the signal driver/receiver over the passive cable by modulating the enable or disable control. At step 508, the subsystem may receive, over the passive cable, a remote unique ID of a signal driver/receiver in a second subsystem connected by the passive cable by monitoring timings of transitions on the LOS control. Method 500 may eventually continue to step 510, where method 500 may stop.

Figure 6:
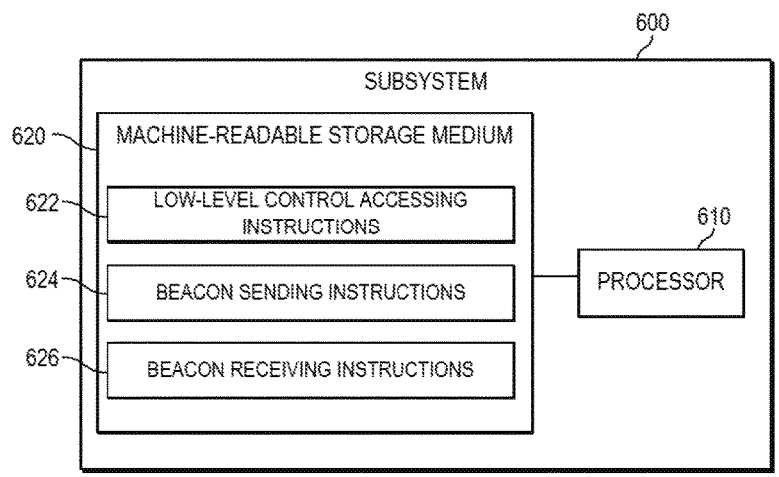
FIG. 6 is a block diagram of an example subsystem for discovering connection of passive cables.

FIG. 6 is a block diagram of an example subsystem 600 for discovering connection of passive cables. Subsystem 600 may be similar to subsystem 110 or subsystem 120 of FIG. 1, for example. Thus, in some examples, subsystem 600 as described herein may describe how subsystem 110 works and equally or similarly how subsystem 120 works. In some specific examples, a first subsystem similar to subsystem 600 may be connected (or connectable) by a passive cable (e.g., similar to passive cable 140) to a second subsystem similar to subsystem 600. In the embodiment of FIG. 6, subsystem 600 includes a processor 610 and a machine-readable storage medium 620. Although the following descriptions refer to a single processor and a single machine-readable storage medium, the descriptions may also apply to a subsystem with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular embodiment shown in FIG. 6, processor 610 may fetch, decode, and execute instructions 622, 624, 626 to discover connection of passive cables. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 620 may be any electronic, magnetic, optical, or other physical storage device that stores executable instructions. Thus, machine-readable storage medium 620 may be, for example. Random Access Memory (RAM), an Electrically-Erasable Programmable Read-Only Memory (EEPROM), a storage drive, an optical disc, and the like. Machine-readable storage medium 620 may be disposed within subsystem 600, as shown in FIG. 6. In this situation, the executable instructions may be "installed" on the subsystem 600. Alternatively, machine-readable storage medium 620 may be a portable, external or remote storage medium, for example, that allows subsystem 600 to download the instructions from the portable/external/remote storage medium. In this situation, the executable instructions may be part of an "installation package". As described herein, machine-readable storage medium 620 may be encoded with executable instructions for discovering connection of passive cables.

Referring to FIG. 6, low-level control accessing instructions 622, when executed by a processor (e.g., 610), may cause subsystem 600 to access a low-level enable or disable control of a signal driver/receiver in the subsystem and a low-level loss-of-signal (LOS) control of the signal driver/receiver. The signal driver/receiver is capable of sending and receiving data and signals over a passive cable. Beacon sending instructions 624, when executed by a processor (e.g., 610), may cause subsystem 600 to send beacons over the passive cable to a second subsystem by modulating the enable or disable control. These beacons are used to determine that some device is connected on the other end of the passive cable. Beacon receiving instructions 626, when executed by a processor (e.g., 610), may cause subsystem 600 to receive, over the passive cable, beacons from the second subsystem connected by the passive cable by monitoring timings of transitions on the LOS control.

The invention claimed is:

1. A subsystem to enable discovering connection of passive cables, the system comprising:
   a signal driver/receiver to send and receive data and signals over a passive cable; and
   a connection discovery engine to access a low-level enable or disable control of the signal driver/receiver and a low-level loss-of-signal (LOS) control of the signal driver/receiver,
   wherein the connection discovery engine modulates the low-level enable or disable control to generate and send a local unique ID of the signal driver/receiver over the passive cable, and wherein the connection discovery engine monitors timings of transitions on the low-level LOS control to receive, over the passive cable, a remote unique ID of a signal driver/receiver in a second subsystem connected by the passive cable.

2. The subsystem of claim 1, wherein by modulating the low-level enable or disable control, the connection discovery engine causes the signal driver/receiver to transition between a high power output and a zero power output.

3. The subsystem of claim 1, wherein by monitoring timings of transitions on the low-level LOS control, the connection discovery engine determines how the signal driver/receiver in a second subsystem transitions between a high power output and a zero power output.

4. The subsystem of claim 1, wherein the connection discovery engine is further to modulate the low-level enable or disable control to send beacons over the passive cable and monitors timings of transitions on the low-level LOS control to receive beacons, wherein the connection discovery engine uses these beacons to determine that some device is connected on the other end of the passive cable.

5. The subsystem of claim 4, wherein the connection discovery engine waits to receive a beacon before it sends the local unique ID, and wherein the remote unique ID of the second subsystem is received in response to the connection discovery engine sending a beacon.

6. The subsystem of claim 4, wherein the modulation of the low-level enable or disable control to send beacons maintains a low power signal over the passive cable by limiting the duration during which the signal driver/receiver has a high power output.

7. The subsystem of claim 1, wherein the connection discovery engine is further to monitor timings of transitions on the low-level LOS control to determine that a device on the other end of the passive cable has been unplugged, by determining that the amount of time that the low-level LOS control is asserted is greater than a defined period of time.

8. The subsystem of claim 1, wherein the signal driver/receiver is an electrical/optical (EO) engine.

9. The subsystem of claim 1, wherein the local unique ID is sent and the remote unique ID is received over the passive cable in-band, using at least one line of the passive cable that is also used to send and receive data during normal data communication.

10. A method executed in a first subsystem to enable discovering connection of passive cables, the method comprising:
    accessing a low-level enable or disable control of a signal driver/receiver in the first subsystem and a low-level loss-of-signal (LOS) control of the signal driver/receiver, wherein the signal driver/receiver allows sending and receiving data and signals over a passive cable;
    generating and sending a local unique ID of the signal driver/receiver over the passive cable by modulating the low-level enable or disable control; and
    receiving, over the passive cable, a remote unique ID of a signal driver/receiver in a second subsystem connected by the passive cable by monitoring timings of transitions on the low-level LOS control.

11. The method of claim 10, further comprising sending the local unique ID and the remote unique ID to a high-level management tool so that it can compare the IDs received from the first subsystem to local and remote unique IDs received from the second subsystem to discover that the first subsystem and second subsystem are connected via the passive cable.

12. The method of claim 11, wherein the sending of the local unique ID and the receiving of the local unique ID occurs before normal data communication begins between the first and the second subsystem over the passive cable.

13. The method of claim 11, wherein the sending of the local unique ID and the receiving of the local unique ID are separate sub-routines of the method that reoccur and run concurrently with each other and independent of each other.

14. A machine-readable non-transitory storage medium encoded with instructions for discovering connection of passive cables, the instructions executable by a processor of a first subsystem to cause the first subsystem to:

access a low-level enable or disable control of a signal driver/receiver in the subsystem and a low-level loss-of-signal (LOS) control of the signal driver/receiver, wherein the signal driver/receiver allows sending and receiving data and signals over a passive cable;

generate and send beacons over the passive cable to a second subsystem by modulating the low-level enable or disable control, wherein these beacons are used to determine that some device is connected on the other end of the passive cable; and receive, over the passive cable, beacons from the second subsystem connected by the passive cable by monitoring timings of transitions on the low-level LOS control.

15. The machine-readable non-transitory storage medium of claim 14, wherein the instructions are executable by the processor to further cause the first subsystem to modulate the low-level enable or disable control to send a local unique ID of the signal driver/receiver over the passive cable and monitor timings of transitions on the low-level LOS control to receive, over the passive cable, a remote unique ID of a signal driver/receiver in the second subsystem connected by the passive cable.

* * * * *